July 7, 1931.  E. M. FRASER  1,813,393
ELECTRIC MACHINE
Filed Nov. 16, 1925   5 Sheets-Sheet 1

INVENTOR
Ethelbert M. Fraser
BY
Kiddle Margeson
his ATTORNEYS

July 7, 1931.  E. M. FRASER  1,813,393
ELECTRIC MACHINE
Filed Nov. 16, 1925   5 Sheets-Sheet 2
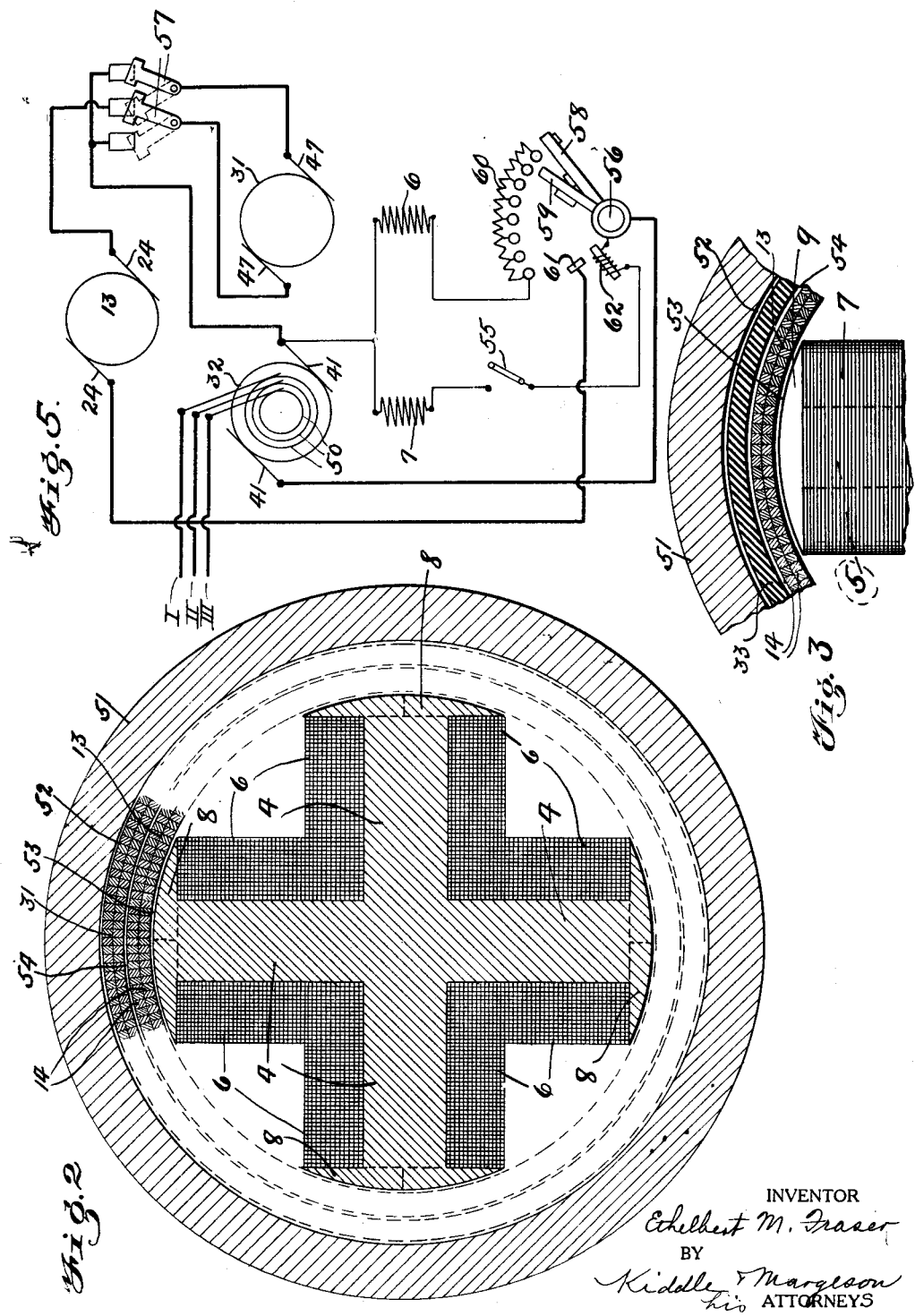
INVENTOR
Ethelbert M. Fraser
BY
Kiddle & Margeson
his ATTORNEYS

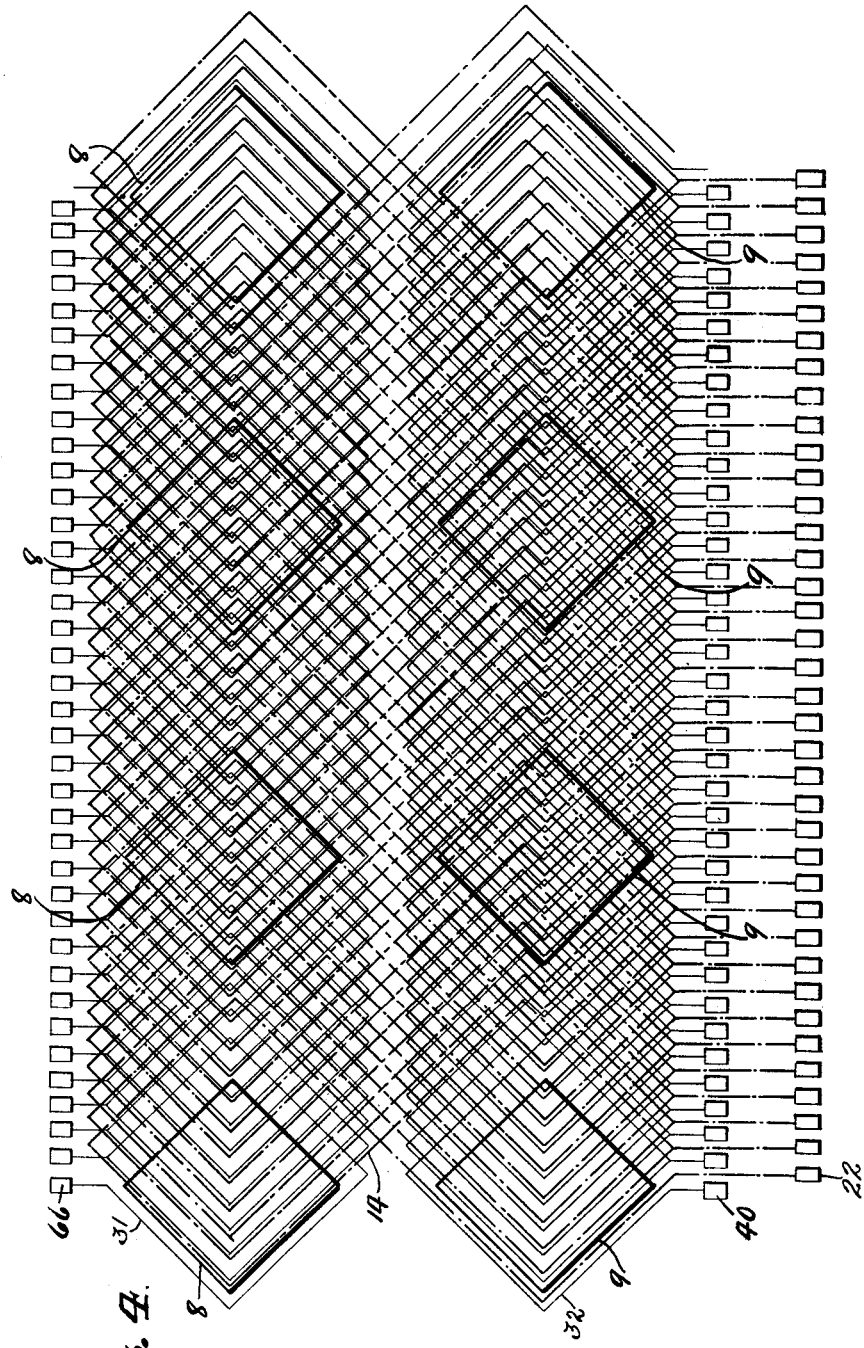

July 7, 1931.  E. M. FRASER  1,813,393
ELECTRIC MACHINE
Filed Nov. 16, 1925  5 Sheets-Sheet 4

INVENTOR
Ethelbert M. Fraser
BY Kiddle Margeson
his ATTORNEYS

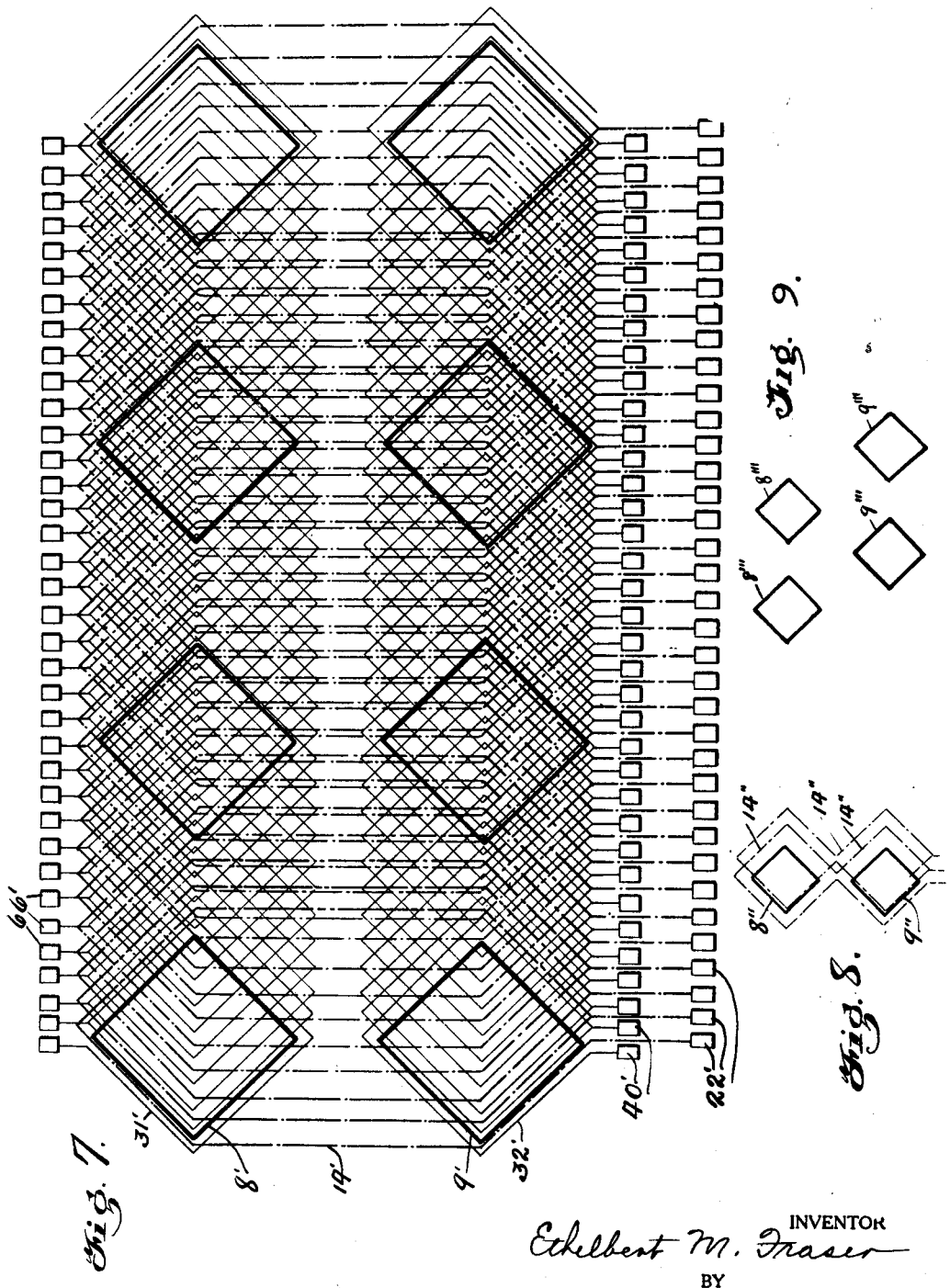

Patented July 7, 1931

1,813,393

UNITED STATES PATENT OFFICE

ETHELBERT M. FRASER, OF YONKERS, NEW YORK

ELECTRIC MACHINE

Application filed November 16, 1925. Serial No. 69,236.

My invention relates to an improvement in electric machines and particularly to what I will hereinafter refer as a variable speed alternating current motor, this terminology being employed for clarity of description.

Some of the objects of my invention are to provide:

(1) A unitary structure whereby alternating current taken from any suitable source is supplied to a unitary electric machine which transforms or converts the alternating current into direct current, the latter being then utilized to operate said machine by which electrical energy is transformed into kinetic energy; (2) an electric machine utilizing alternating current and adapted to operate at any selected or predetermined constant speed; (3) an alternating current motor possessing the above characteristics, the torque of which can be varied within wide limits without varying the speed; (4) an electrical machine embodying a rotary transformer or converter, by which alternating current is converted into direct current, the field of the transformer or converter being employed to assist in the excitation of a motor inductor winding constituting a part of the machine; (5) an electric machine comprising a rotary transformer inductor winding, a generator inductor winding and a motor inductor winding, two of these windings cutting a common field flux; (6) an alternating current electric motor in which the speed and torque are varied by varying the field strength; (7) an alternating current electric machine comprising a motor inductor winding and provided with a divided field, one field being maintained constant while the other is varied to vary the speed and torque of the motor inductor winding; (8) an electric machine operating on alternating current in which the power factor of the motor constituting a part of the machine can be varied within wide limits; (9) an alternating current electric machine adapted to supply a leading current to the line or source of alternating current supply; and (10) an electric machine comprising a rotary transformer or converter and a motor inductor winding, so arranged that alternating current at a certain voltage may be taken from the line and the motor inductor winding operated at any speed other than synchronous speed—that is, current can be taken from any source of alternating current supplying any number of cycles and used to operate a motor inductor winding at any desired speed, independently of the number of cycles of the impressed current.

Other objects will appear from the drawings and the detailed description to follow.

In one embodiment of my invention I provide a magnetic flux-producing field structure, an inductor winding that normally functions as a converter or transformer winding, an inductor winding that normally functions as a motor-generator inductor winding, and an independently rotatable widing that normally functions as a motor inductor winding.

In the preferred embodiment of my invention the flux-producing field structure of my improved machine is the inner stationary member. The converter and motor-generator inductor windings constitute the outer member, while the motor inductor winding is intermediate the field structure and the outer windings.

One embodiment of my invention is illustrated in the accompanying drawings, in which Fig. 1 is a longitudinal view partly in section of my improved variable speed alternating current motor;

Fig. 2 is a section of the motor on the line 2—2 of Fig. 1;

Fig. 3 is a section on the line 3—3 of Fig. 1;

Fig. 4 illustrates a development of a preferred arrangement of the inductor windings in relation to their respective commutator bars and the pole pieces of the field structure;

Fig. 5 is a wiring diagram;

Figs. 7 and 8 illustrate modified arrangements of the motor inductor windings in relation to the pole pieces;

Fig. 9 illustrates a modified arrangement of the field cores and pole pieces.

Figure 1:
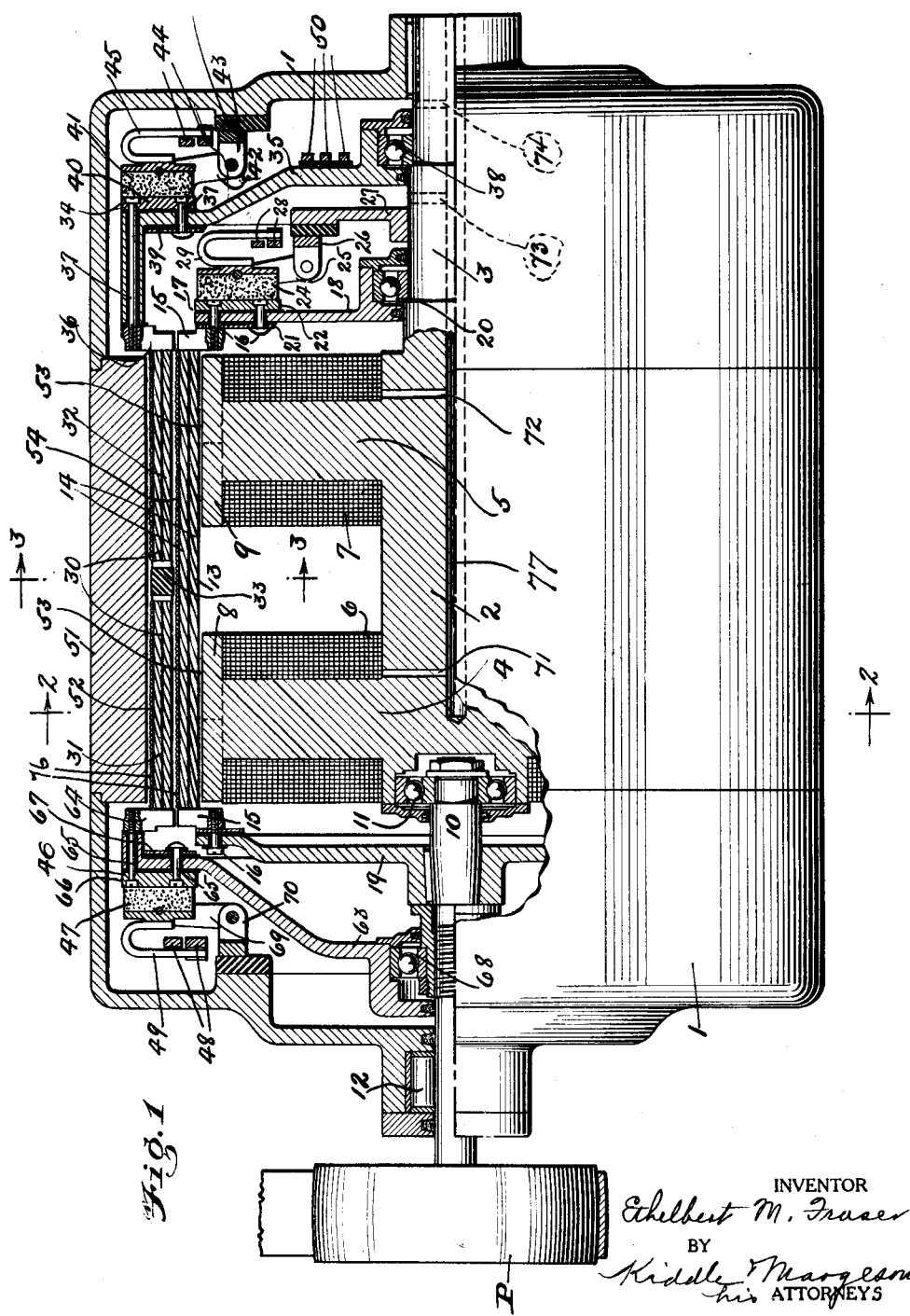

Referring to the drawings in detail, and first of all to Figs. 1, 2 and 3, 1 designates a casing or housing adapted to be suitably secured to a standard or support of any desired type (not shown). Within the housing and extending longitudinally thereof is a stationary member 2 comprising a stationary field structure and a centrally disposed outwardly extending hub 3.

*Field structure*

The field structure above referred to comprises two sets (preferably four poles each) of magnetically independent field magnets 4 and 5, respectively, preferably of soft steel and longitudinally alined with respect to each other. The strength of one of said fields may be maintained constant, while the strength of the other may be varied, as will be hereinafter pointed out. Each field magnet 4 comprises the coils 6 and pole pieces 8, while each field magnet 5 comprises the coils 7 and pole pieces 9. The hub is centrally and rigidly secured to the housing 1.

The field structure 2 is supported centrally within the housing 1 at one end by the hub 3 and at the other end by the shaft 10 on which the field structure is supported by the bearings 11. Near its outer end the shaft 10 is rotatably supported in the housing by the bearing 12, while the extreme outer end of the shaft 10 is provided with a member to be driven, such as a pulley P.

*Inductor winding 13*

Surrounding the field structure just described is the rotor or winding 13 comprising a plurality of copper wires or bars 14 built up to form a hollow cylinder. The copper wires or bars 14 are bound together and supported by suitable heat-hardened insulating material, such as bakelite, thus permitting the winding to be built up of non-magnetic material into a unitary structure which will be self-sustaining, thus eliminating the need of a core or laminations of magnetic material for strength or support. That portion of each copper wire or bar that cuts the field flux I designate an inductor, and I call the winding 13 a motor inductor winding, as it normally functions as such.

The motor inductor winding 13 is connected at one end by means of clips 15 and bolts 16 to the commutator 17, which is secured to but insulated from aluminum spider 18, and at the other end the motor inductor winding is connected to the aluminum spider 19 by clips and bolts, similar to the clips and bolts 15 and 16, suitably insulated from spider 19 by mica or other insulating material. The aluminum spider 18 is supported by the bearing 20 on the hub 3, while the spider 19 is keyed or otherwise rigidly secured to the shaft 10.

*Commutator and brushes for inductor winding 13*

The commutator 17 is of the disc type and comprises copper strips 21 and commutator bars 22 disposed on opposite sides of the spider 18 but insulated therefrom by mica or any other suitable insulating material, the copper strips and commutator bars being held together by the bolts 16. The clips 15 and bolts 16 are also insulated from the spider 19 by mica or other suitable insulating material.

The commutator brush 24 is pivotally mounted on the arm 25, which in turn is pivotally mounted on the brush holder support 26, the latter being rigidly mounted on but insulated from the spider 27 which is rigidly secured to the hub 3. The brush 24 is electrically connected to cross-connecting rings 28 by leads 29.

While I have illustrated and described only one brush, it is to be understood that in the machine of the present invention I preferably employ four such brushes with each commutator.

*Inductor windings 31 and 32*

Surrounding the motor inductor winding 13 is the rotor 30, which comprises two sets of windings 31 and 32, electrically independent of each other and of the winding 13 in that each winding may be separately excited. The windings 31 and 32 are axially disposed and mechanically secured to each other by the insulating ring 33. The windings 31 and 32 are therefore rotatable only in like direction. Each of the windings 31 and 32 comprises a plurality of copper wires or bars built up to form a hollow cylinder, as described in connection with winding 13. Inasmuch as the windings 31 and 32 cut a field flux, I have herein termed these inductor windings. The winding 32 normally functions as a converter or transformer inductor winding while the winding 31 normally functions as a motor or generator inductor winding.

*Commutators and brushes for inductor windings 31 and 32*

The winding 32 is provided with a commutator 34 which is secured thereto and to the aluminum spider 35 by means of clips 36 and bolts 37. The clips 36 and bolts 37 are suitably insulated from the spider 35 by mica or other insulating material. The spider 35 is rotatably supported on the hub 3 by bearings 38.

Commutator 34 is also of the disc type and comprises insulated washer 39 and commutator bars 40, which are disposed on opposite sides of the spider 35 and suitably insulated therefrom by mica or other insulating material, the bars 40 being secured to the spider 35 by means of the bolts 37, which are also suitably insulated from the spider 35.

The brush 41 for the commutator 34 is mounted on the arm 42, which in turn is pivotally mounted on the brush holder support 43, the latter being secured to but insulated from the casing 1. The brush 41 is electrically connected to cross-connecting rings 44 by leads 45.

The winding 31 is also provided with a commutator 46, similar in construction to the commutator just described, secured to the winding 31 and to the aluminum spider 63 by means of clips 64 and bolts 65. The clips 64 and bolts 65 are suitably insulated by mica or other insulating material from the spider and the latter is rotatably supported by bearings 68 on the shaft 10. The commutator 46 comprises commutator bars 66 and copper washers 67, which are disposed on opposite sides of the spider 63 and suitably insulated therefrom by mica or other insulating material, the bars 66 being secured to the spider 63 by means of the bolts 65. The commutator 46 is also provided with brush 47 similar in construction to the brush 41. Brush 47 is suitably connected to the arm 69, which is pivotally secured to the brush holder support 70, which is connected to but insulated from the housing or casing 1. The brush 47 is also connected to cross connecting rings 48 by suitable leads 49.

Inasmuch as the winding 32 is to function as a rotary converter, I provide a set of collector rings 50, preferably three in number, secured to but insulated from the spider 35 and connected to the winding 32 in the usual way in which collector rings are connected in a rotary converter.

In order to furnish a return path for the magnetic flux I provide a ring 51 of substantially the same width as the length of the inductor windings. This ring 51, which is preferably of soft iron, forms a part of the casing 1 and surrounds the windings 31 and 32 and is separated therefrom by the air gap 52.

The general arrangement of the stationary and rotatable members hereinbefore described clearly appears from Figs. 1, 2 and 3, from which figures it will be noted that the stationary field structure 2, with its field cores 4 and 5, field coils 6 and 7 and pole pieces 8 and 9, is surrounded by the motor inductor winding 13, which in turn is surrounded by the inductor winding 30 and the ring 33. The winding 13 is separated from the pole pieces 8 and 9 by the air gap 53, while the windings 31 and 32 are separated from the winding 13 by the air gap 54.

In order that electrical connection may be made with the field coils and the various collector and cross-connecting rings, the hub 3 and the field structure 2 are suitably drilled to provide the longitudinally-extending bore 77 with smaller bores 71, 72, 73 and 74 at right angles thereto. This will permit electrical connections to be made with the field coils 6 and 7, the connecting rings 28 and the collector rings 50, respectively. The housing is also provided with suitable openings (not shown) to permit electrical connections to be made with connecting rings 44 and 48.

As will be seen from Fig. 4, the pole pieces 8 and 9 are indicated in heavy full lines, the inductors 14 of the winding 13 are indicated by dot and dash lines, while the inductors of the windings 31 and 32 are indicated by light full lines. As therein shown, the pole pieces 8 and 9 of the field magnets are turned at an angle of 45 degrees relatively to the longitudinal axis of the machine—that is, to the axis of rotation of the inductor windings. By thus turning the pole pieces through an angle of 45 degrees, the inductors of the windings 31 and 32, as hereinafter pointed out, will extend parallel to the edges of the pole pieces—in other words, they will extend diagonally at the same angle with respect to the longitudinal axis of the machine as the pole pieces themselves. By this construction there is a considerable saving in material as substantially the entire winding functions as an inductor, instead of part of the winding functioning as an inductor and the remainder of the winding as a conductor.

Figure 6:
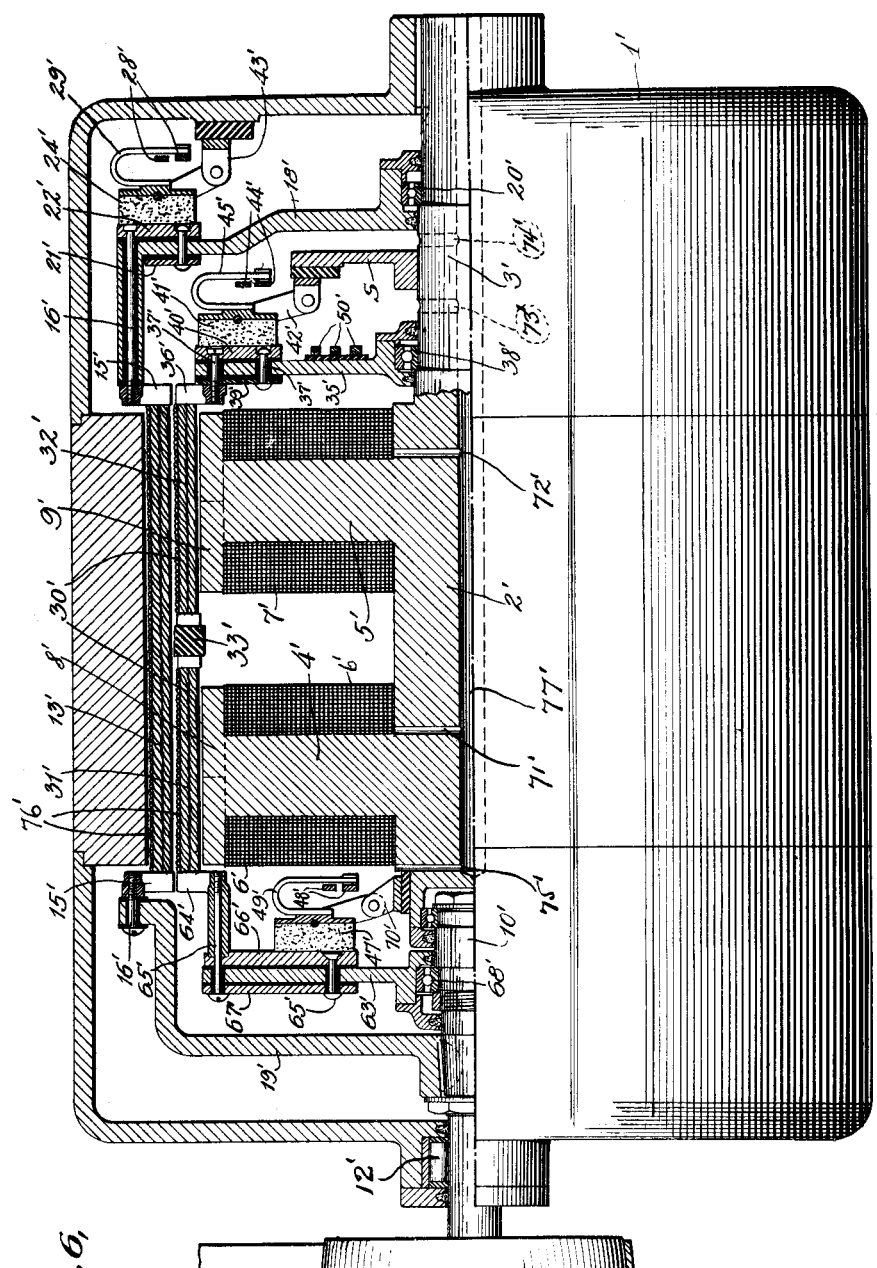
Fig. 6 is a longitudinal view partly in section showing a modification of the apparatus of Fig. 1.

In Fig. 6 I show a modification of my improved electric machine, the construction being the same as that shown in Fig. 1, with the exception that the inductor windings 13' and 30' have been interchanged, while the spider 63', commutator 46', brush 47' and brush-support 70' corresponding to spider 63, commutator 46, brush 47 and brush-support 70 of Fig. 1 have been placed inside the spider 19' corresponding to spider 19.

In the machine illustrated in Fig. 6, the hub 3' and field structure 2' are provided with the longitudinally-extending bore 77' and with smaller bores 71', 72', 73', 74', 75' at right angles thereto, whereby electrical connection can be made with the field coils 6' and 7', the collector rings 50', the connecting rings 44', and the connecting rings 48', respectively. The housing is also provided with a suitable opening (not shown) to permit electrical connection to be made with connecting rings 28'.

Operation

Referring now to the wiring diagram of Fig. 5, alternating current is supplied through leads I, II and III to the collector rings 50. At this time the constant field switch 55 and the switch 56 controlling the variable field 6 are open. With these switches in open position the inductor winding 32 being a polyphase motor is brought up substantially to synchronism, after which the constant field switch 55 is closed to excite the constant field magnets 7. The winding 32 will then come up to exact synchronism and thereafter function as a rotary converter and deliver direct current to the brushes 41.

The reversing switch 57 is now thrown to "bucking" position, that is to say, to the full line position shown in Fig. 5, and the switch 56 is moved to the left from the position shown on the drawing to bring the contact carried by the inductor-controlling arm 59 into engagement with the fixed contact 61 and at the same time to cut all of the resistance 60 out of the circuit of the variable field magnet winding 6. With the parts in this position, however, the winding 13 receives no current, inasmuch as the voltage being delivered by the winding 32 is opposed by the voltage being delivered by the winding 31, which is now operating as a generator because this winding is attached to and rotates with the winding 32 and cuts the field flux of the variable field 6. The switch arm 59 is left in position to hold its contact into engagement with the fixed contact 61, being held in that position by the magnet 62, while the switch arm 58 is moved to the right again to cut in some of the resistance 60 in the circuit of the field magnet winding 6, thereby weakening the field 6 to bring about a differential between the current delivered by the winding 32 and the current generated by the winding 31, the resultant current flowing to the inductor winding 13. The inductor winding 13 will now rotate as a motor winding, and to bring the speed of this winding up to maximum without changing the position of the reversing switch 57 it is merely necessary to move the arm 58 further to the right to further weaken the field 6 until maximum speed is obtained. The torque of the inductor winding 13 may now be increased, if desired, by throwing the reversing switch 57 to the dotted line position shown on the drawings, which is its "adding" position, so that the voltage generated by the winding 31 instead of opposing the voltage of the winding 32 will be added thereto, thereby increasing the voltage of the current delivered to the winding 13 to increase the torque of the latter without, however, increasing its speed.

If desired, the winding 31 may be cut out of the circuit entirely by opening the switch 58 and moving the reversing switch 57 to mid position, thereby short-circuiting the winding 31, the inductor winding 13 then only receiving current from the winding 32.

It will be understood also, as I have explained above, that, if desired, the arrangement of the windings 13 and 30 may be reversed as shown, for example, in Fig. 6. Various other modifications may be made also without departing from the spirit and scope of the present invention.

No claim is made herein to the inductor windings per se or to the method of constructing the same, herein disclosed, inasmuch as the said windings and method constitute the subject-matter of my co-pending application Serial No. 254,349, filed February 15, 1928, which is a division of the present application.

What I claim is:

1. An electric machine comprising two field structures, a rotary converter winding, a generator inductor winding secured to but insulated from said converter winding, and a motor inductor winding, the converter winding and the motor inductor winding being adapted to cut the flux produced by one of said field structures, and the generator inductor winding and the motor inductor winding being adapted to cut the flux produced by said other field structure.

2. An electric machine comprising a stationary field structure adapted to produce two magnetically independent fields, a converter winding rotatable in one of said fields, a second winding secured to but insulated from said first mentioned winding rotatable in said other field and provided with means for receiving current from said first mentioned winding, a winding intermediate said field structure and said first two mentioned windings and rotatable in both fields, resistance in the circuit of one of said fields, and means for cutting said resistance in and out of said field circuit.

3. An electric machine comprising a stationary field structure adapted to produce two magnetically independent fields, a winding rotatable in one of said fields and provided with means for receiving alternating current and transforming the same into direct current, a second winding secured to but insulated from said first mentioned winding rotatable in said other field and provided with means for receiving said direct current from said first mentioned winding, a winding rotatable in both of said fields, a commutator and brushes for each of said windings, resistance in the circuit of one of said fields, means for cutting said resistance in and out of said field circuit, and means for adding or opposing the current generated by said second winding to the direct current delivered by said first mentioned winding.

4. In an electric machine the combination of a rotatable winding adapted to convert alternating current into direct current, two field magnet structures adapted to be excited by said converted current to produce two magnetically independent fluxes, a second winding attached to said first winding and rotated thereby in one of said fluxes to generate direct current, a third winding adapted to receive said converted current and said generated current rotatable in both of said fluxes, and means for varying the voltage of the current supplied to said third winding.

5. In an electric machine the combination of a field structure comprising two sets of field magnets, two rotatable windings rigidly secured to each other and adapted to cut the flux produced by one set of field magnets, an independently rotatable winding adapted to cut the flux produced by the other set of field magnets and to receive current from the first two mentioned windings, means for varying the excitation of one set of said field magnets to vary the speed of said intermediate winding, and a switch for varying the relation between the currents of the first two windings to vary the torque but not the speed of said third winding.

6. The method of absorbing and transforming electric energy into kinetic energy, which method consists in applying alternating current to a rotatable group of inductors to convert said alternating current into direct current, energizing a field magnet by said direct current to create a magnetic flux, rotating in said magnetic flux another group of inductors rotatable only in the same direction as said first group of inductors to generate direct current that may be added to or opposed to the said first mentioned direct current, and transmitting the resultant current of said two groups of inductors to another group of inductors rotatable in said magnetic flux to produce kinetic energy.

7. The method of absorbing and transforming electric energy into kinetic energy, which method consists in applying alternating current to a group of inductors to convert said current into direct current, creating and maintaining a constant magnetic field flux and an independent variable magnetic field flux, transmitting said direct current to a group of inductors rotating synchronously with said first mentioned group of inductors and cutting said variable magnetic field flux to generate direct current, and transmitting the resultant current generated by said two groups of inductors to an independently rotatable group of inductors cutting both magnetic fluxes to produce kinetic energy.

8. An electric machine comprising a field structure, and three unitary self-sustaining cylindrical rotatable inductor windings in inductive relation with said field structure, two of said windings being connected together but insulated from each other and rotatable only in like direction.

9. An electric machine comprising a field structure having two sets of flux-producing elements adapted to produce two magnetically independent fluxes, an inductor winding adapted to cut only one of said fluxes, another inductor winding adapted to cut only the other of said fluxes, and a third rotatable inductor winding adapted to cut only both of said fluxes.

10. An electric machine comprising a stationary field structure having two sets of flux-producing elements adapted to produce two magnetically independent fluxes, two electrically independent rotatable inductor windings in alignment and mechanically secured to each other, each winding being adapted to cut only a different flux so produced by said field structure, and a rotatable inductor winding intermediate said field structure and said first mentioned windings and adapted to cut only both of said fluxes.

11. An electric machine comprising a field structure having two sets of flux-producing elements adapted to produce two magnetically independent fields, means for varying the strength of one of said fields while the other remains constant, two inductor windings secured to and insulated from each other, one of said windings being rotatable only in the constant field while the other winding is rotatable only in the variable field, and a third inductor winding rotatable only in both fields.

12. An electric machine comprising a stationary field structure having two sets of flux-producing elements adapted to produce two magnetically independent fluxes, two rotatable inductor windings mechanically secured to and insulated from each other, each winding being adapted to cut only a different flux produced by said field structure, a third rotatable inductor winding adapted to cut only both of said fluxes, and means for varying the torque and maintaining the speed of the last-mentioned winding.

13. An electric machine comprising a stationary field structure having two sets of flux-producing elements adapted to produce two magnetically independent fluxes, two inductor windings rotatable only in like direction, each of said windings being adapted to cut only a different flux produced by said field structure, a third rotatable inductor winding adapted to cut only both of said fluxes, and means for varying the torque of the last-mentioned winding inversely as the rotative speed of said winding.

14. An electric machine comprising a field structure having two sets of flux-producing elements adapted to produce two magnetically independent fields, means for varying the strength of one of said fields while the other remains constant, two inductor windings secured to and insulated from each other, one of said windings being rotatable only in the constant field while the other winding is rotatable only in the variable field, and a third inductor winding rotatable only in both fields, and means for varying the speed and torque of said third winding.

15. An electric machine comprising a field structure, and two rotatable members comprising three electrically independent inductor windings in inductive relation with said field structure, each of said members forming a unitary cylindrical structure depending solely upon non-magnetic material for its support, and means for rotatably mounting said members in said machine.

This specification signed this 14th day of November, 1925.

ETHELBERT M. FRASER.